US012634798B2

(12) United States Patent 
Yang

(10) Patent No.: US 12,634,798 B2 
(45) Date of Patent: May 19, 2026

(54) RELAY UE SELECTION METHOD AND APPARATUS, INFORMATION PROCESSING METHOD AND APPARATUS, AND DEVICE AND MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 283 days.

(21) Appl. No.: 18/271,228

(22) PCT Filed: Jan. 6, 2021

(86) PCT No.: PCT/CN2021/070533

§ 371 (c)(1),
(2) Date: Jul. 6, 2023

(87) PCT Pub. No.: WO2022/147695

PCT Pub. Date: Jul. 14, 2022

(65) Prior Publication Data

US 2024/0064606 A1 Feb. 22, 2024

(51) Int. Cl.
*H04W 40/22* (2009.01)
*H04W 88/04* (2009.01)

(52) U.S. Cl.
CPC ............ *H04W 40/22* (2013.01); *H04W 88/04* (2013.01)

(58) Field of Classification Search
CPC ..... H04W 76/10; H04W 84/12; H04W 88/06; H04W 8/005; H04W 92/18; H04W 84/18; H04W 76/14; H04W 40/22; H04W 88/04; Y02D 30/70
See application file for complete search history.

(56) References Cited

U.S. PATENT DOCUMENTS

| | | | | |
|---|---|---|---|---|
| 8,601,157 | B2 | 12/2013 | Hozumi | |
| 10,904,933 | B2 * | 1/2021 | Bangolae | .............. H04W 4/023 |
| 2004/0233918 | A1 * | 11/2004 | Larsson | ............... H04B 7/2606 |
| | | | | 370/400 |
| 2012/0239821 | A1 | 9/2012 | Hozumi | |
| 2012/0294228 | A1 * | 11/2012 | Song | ..................... H04L 1/0003 |
| | | | | 370/315 |
| 2016/0286459 | A1 * | 9/2016 | Enomoto | ................. H04W 4/06 |
| 2017/0086114 | A1 * | 3/2017 | Jung | ................... H04W 52/383 |

(Continued)

FOREIGN PATENT DOCUMENTS

| | | |
|---|---|---|
| CN | 101242367 A | 8/2008 |
| CN | 104754649 A | 7/2015 |

(Continued)

OTHER PUBLICATIONS

International Search Report issued in Application No. PCT/CN2021/070533 dated Jun. 21, 2021, (4p).

(Continued)

*Primary Examiner* — Ninos Donabed
(74) *Attorney, Agent, or Firm* — Arch & Lake LLP; Hao Tan; Shen Wang

(57) ABSTRACT

A method for selecting a relay UE, a method for processing information are provided. The method for selecting a relay UE includes selecting, according to load information of candidate UEs, a relay UE from the candidate UEs.

20 Claims, 6 Drawing Sheets

(56)     References Cited

U.S. PATENT DOCUMENTS

| | | | |
|---|---|---|---|
| 2017/0339597 A1 | 11/2017 | Yokota et al. | |
| 2017/0359116 A1* | 12/2017 | Hwang | H04W 40/22 |
| 2018/0084478 A1* | 3/2018 | Lee | H04W 28/12 |
| 2018/0084481 A1* | 3/2018 | Wang | H04W 40/22 |
| 2018/0109985 A1* | 4/2018 | Huang | H04W 36/322 |
| 2018/0139682 A1* | 5/2018 | Xu | H04W 40/22 |
| 2018/0249520 A1* | 8/2018 | Li | H04W 8/005 |
| 2018/0295534 A1* | 10/2018 | Huang | H04W 76/15 |
| 2019/0387429 A1 | 12/2019 | Mallick et al. | |
| 2020/0154324 A1* | 5/2020 | Ozturk | H04W 16/14 |
| 2021/0084558 A1* | 3/2021 | Speicher | H04W 36/22 |
| 2021/0297842 A1* | 9/2021 | Shrivastava | H04W 28/24 |

FOREIGN PATENT DOCUMENTS

| | | | |
|---|---|---|---|
| CN | 105992298 A | 10/2016 | |
| CN | 109862542 A | 6/2019 | |

OTHER PUBLICATIONS

CNOA issued in Application No. 202180000144.5 dated Mar. 5, 2025 with English translation, (22p).

\* cited by examiner

S110 : selecting, according to load information of candidate UEs, a relay UE from the candidate UEs base station second UE sending load indication information,
where the load indication
information is used for a second UE
to determine load information

FIG. 6 apparatus for selecting a
relay UE selection module
510

FIG. 7 apparatus for processing
information first sending
module 610

FIG. 8 apparatus for processing
information second sending
module 710

FIG. 9

RELAY UE SELECTION METHOD AND APPARATUS, INFORMATION PROCESSING METHOD AND APPARATUS, AND DEVICE AND MEDIUM

CROSS-REFERENCE

The present application is a U.S. National Stage of International Application No. PCT/CN2021/070533, filed on Jan. 6, 2021, the entire content of which is incorporated herein by reference for all purposes.

TECHNICAL FIELD

The present disclosure relates to, but is not limited to, a field of wireless communication technology, and more particularly, to a method and an apparatus for selecting a relay user equipment (UE), a method and an apparatus for processing information, a communication device and a storage medium.

BACKGROUND

In order to support sidelink communication between UE and UE, a sidelink (SL) communication mode is introduced, and an interface between UE and UE is PC-5. According to a correspondence between a sending UE and a receiving UE, three sidelink transmission modes, i.e. unicast, multicast and broadcast, are allowed on the SL.

The SL communication includes two sending resource allocation modes, one is a mode of network dynamic scheduling, and the other is a mode that UE autonomously selects in a resource pool broadcast by a network. The dynamic scheduling is that the network dynamically allocates a sending resource on the SL for UE according to buffer data report of UE, while the autonomous selection is that UE randomly selects a sending resource from a resource pool which is broadcast by the network or is pre-configured.

SUMMARY

Embodiments of the present disclosure provide a method and an apparatus for selecting a relay user equipment (UE), a method and an apparatus for processing information, a communication device and a storage medium.

According to a first aspect of the present disclosure, a method for selecting a relay user equipment (UE) is provided, applied to a first UE, and includes: selecting, according to load information of candidate UEs, the relay UE from the candidate UEs.

According to a second aspect of the present disclosure, a method for processing information is provided, applied to a second user equipment (UE), and includes:

sending load information, where the load information is used for a first UE to determine a relay UE.

According to a third aspect of the present disclosure, a method for processing information, applied to a base station, and includes:

sending load indication information, where the load indication information is used for a second user equipment (UE) to determine load information, and the load information is used for a first UE to determine a relay UE.

According to a fourth aspect of the present disclosure, an apparatus for selecting a relay user equipment (UE) is provided, applied to a first UE, and includes:

a selection module, configured to select the relay UE from candidate UEs according to load information of the candidate UEs.

According to a fifth aspect of the present disclosure, an apparatus for processing information is provided, applied to a second UE, and includes:

a first sending module configured to send load information, where the load information is used for a first UE to determine a relay UE.

According to a sixth aspect of the present disclosure, an apparatus for processing information is provided, applied to a base station, and includes:

a second sending module configured to send load indication information, where the load indication information is used for a second UE to determine load information, and the load information is used for a first UE to determine a relay UE.

According to a seventh aspect of the present disclosure, a communication device is provided, including a processor, a transceiver, a memory, and an executable program stored in the memory and capable of running on the processor, where the processor is configured to implement the method provided in the above first, second or third aspect when running the executable program.

According to an eighth aspect of the present disclosure, a non-transitory computer storage medium having an executable program stored thereon is provided, where when the executable program is executed by the processor, the method provided in the above first, second or third aspect is implemented.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 6 is a flowchart of a method for processing information according to an embodiment;

FIG. 7 is a structural diagram of an apparatus for selecting a relay UE according to an embodiment;

FIG. 8 is a structural diagram of an apparatus for processing information according to an embodiment;

FIG. 9 is a structural diagram of an apparatus for processing information according to an embodiment;

DETAILED DESCRIPTION

The embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following embodiments do not represent all the implementations consistent with the present invention. Rather, they are merely examples of the apparatus and method consistent with some aspects of the present invention as detailed in the appended claims.

The terms used in the embodiments of the present disclosure are only for the purpose of describing particular embodiments, but should not be construed to limit the embodiments of the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining", depending on the context.

Figures 1, 2:
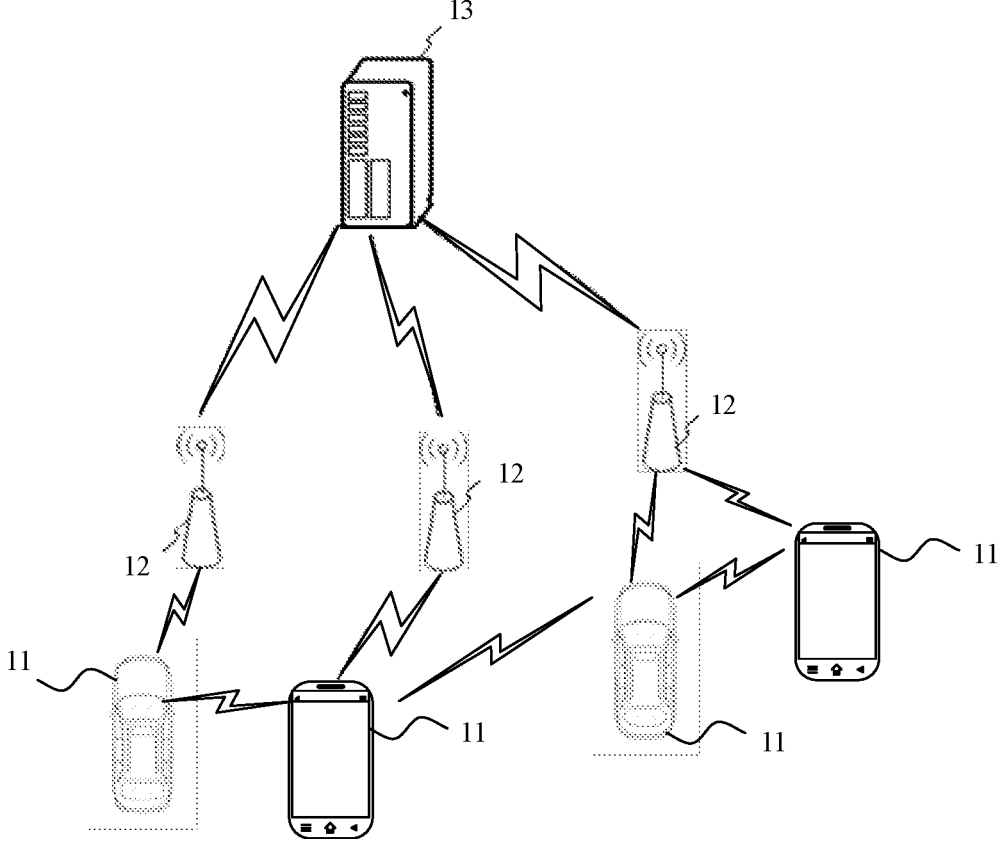
FIG. 1 is a structural diagram of a wireless communication system according to an embodiment.
FIG. 2 is a flowchart of a method for selecting a relay UE according to an embodiment.
Figure 3A:
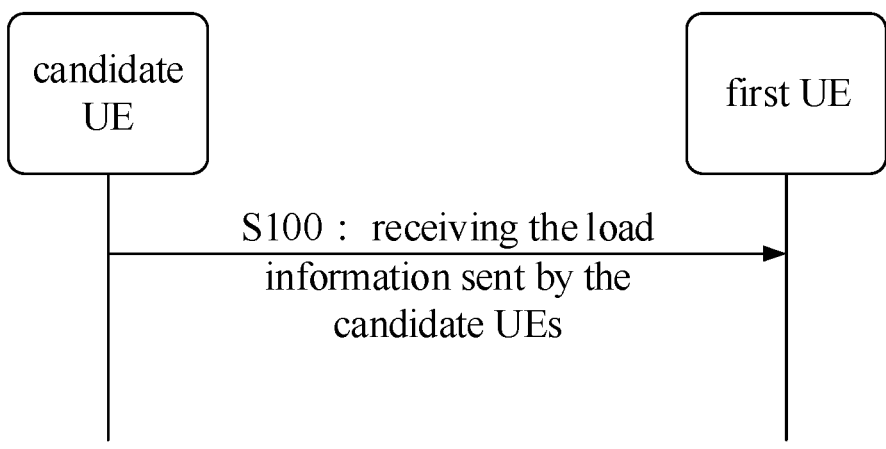
FIG. 3A is a flowchart of a method for selecting a relay UE according to an embodiment.
Figure 3B:
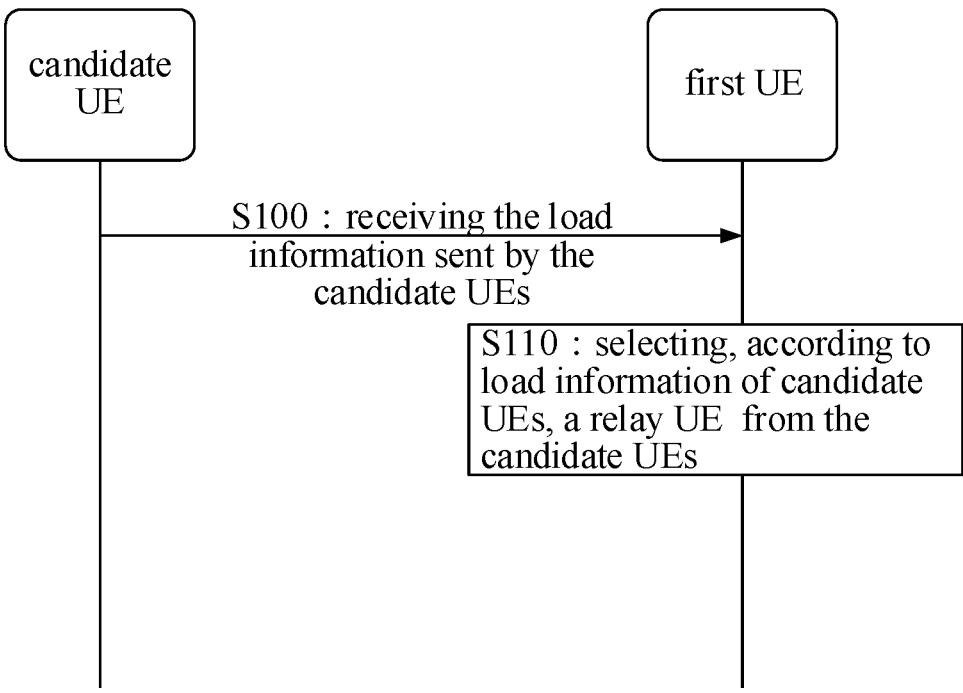
FIG. 3B is a flowchart of a method for selecting a relay UE according to an embodiment.

With reference to FIG. 1, FIG. 1 is a schematic diagram of a wireless communication system. As illustrated in FIG. 1, the wireless communication system is a communication system based on the cellular mobile communication technology, and the wireless communication system may include: a plurality of UEs 11 and a plurality of base stations 12.

The UE 11 may be a device that provides voice and/or data connectivity to a user. The UE 11 may communicate with one or more core networks via a Radio Access Network (RAN). The UE 11 may be an Internet of Things (IoT) UE, such as a sensor device, a mobile phone (or "cellular" phone) and a computer with the IoT UE. The UE 11 may be a fixed, portable, pocket-sized, hand-held, built-in computer or a vehicle-mounted apparatus, such as, a Station (STA), a subscriber unit, a subscriber station, a mobile station, a mobile, a remote station, an access point, a remote terminal, an access terminal, a user terminal, a user agent, a user device, or a user equipment (UE). Alternatively, the UE 11 may also be an unmanned aerial vehicle device. Alternatively, the UE 11 may also be an in-vehicle device, for example, the UE 11 may be a vehicle-mounted computer with a wireless communication function, or a wireless communication device externally connected to a vehicle-mounted computer. Alternatively, the UE 11 may also be a roadside device, for example, a road light with a wireless communication function, a traffic light or other roadside devices and so on.

The base station 12 may be a network-side device in a wireless communication system. The wireless communication system may be the 4th generation (4G) mobile communication system, also known as a Long Term Evolution (LTE) system. Alternatively, the wireless communication system may also be the 5th generation (5G) mobile communication system, also known as a New Radio (NR) system or 5G NR system. Alternatively, the wireless communication system may also be a next-generation system of the 5G system. The access network in the 5G system may be called New Generation-Radio Access Network (NG-RAN), or a machine-type communication (MTC) system.

The base station 12 may be an evolved base station (eNB) adopting a centralized and distributed architecture in the 4G system. Alternatively, the base station 12 may also be a base station (gNB) that adopts a centralized and distributed architecture in the 5G system. When the base station 12 adopts the centralized and distributed architecture, it generally includes a Central Unit (CU) and at least two Distributed Units (DUs). The CU is provided with protocol stacks including a Packet Data Convergence Protocol (PDCP) layer, a Radio Link Control (RLC) layer, and a Media Access Control (MAC) layer. The DU is provided with a protocol stack including a physical (PHY) layer, and the specific implementation manner of the base station 12 is not limited in the embodiments of the present disclosure.

A wireless connection may be established between the base station 12 and the UE 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface may also be a wireless air interface based on a standard of next generation mobile communication network technology based on the 5G.

In some embodiments, an End to End (E2E) connection may also be established between the UEs 11, for example, scenes of vehicle to vehicle (V2V) communication, Vehicle to Infrastructure (V2I) communication and Vehicle to Pedestrian (V2P) communication in a Vehicle to everything (V2X) communication.

In some embodiments, the above wireless communication system may also include a network management device 13.

A plurality of the base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 13 is not limited in the embodiments of the present disclosure.

When UE autonomously selects the sending resource on the SL, if an adjacent UE selects the same sending resource, sending collisions may occur, which reduces reliability.

A UE may achieve communication with a base station without directly connecting to the base station, but through a relay of another UE. The UE that is not connected to the base station is called a remote UE, the UE that provides a relay function is called a relay UE, and the remote UE communicates with the relay UE through the SL.

When the remote UE has not yet left coverage of a wireless network coverage of the base station, the remote UE may report a SL channel quality with one or a plurality of relay UEs to the base station, the base station selects the relay UE and then sends an identifier of the relay UE to the remote UE.

When a plurality of relay UEs are available, the remote UE may select the relay UE based on a signal strength.

As illustrated in FIG. 2, the embodiment of the present disclosure provides a method for selecting a relay UE, which is applied to the first UE, and the method includes step S110:

S110: according to load information of candidate UEs, a relay UE is selected from the candidate UEs.

The first UE may be a remote UE, i.e. a UE that needs to communicate with a base station through a relay UE.

The first UE may be communication terminals in various types, including but not limited to: a mobile phone, a tablet computer, a wearable device, a smart home device, a smart office device, an in-vehicle device, or a road monitoring device.

Of course, the above are only examples of the first UE, and the specific implementation is not limited to any of the above examples.

The candidate UE may be any UE located between the first UE and the base station.

The load information of the candidate UE may include at least one of the following:

load information of a cellular communication link of the candidate UE;

load information of a SL of the candidate UE;

a load rate of a processing resource for the candidate UE.

For example, there is a relatively large surplus of a bandwidth that is allocated by the base station to the cellular communication link of the candidate UE, which indicates that current load rate of the cellular communication link of the candidate UE is low.

For another example, the candidate UE itself performs SL communication with one or a plurality of UEs on the SL, and thus current load rate of the SL of the candidate UE is high.

The processing resource may at least include a load rate of a Central Processing Unit (CPU) of the UE and/or the load rate of a Micro Control Unit (MCU) of the UE.

In this way, the first UE may select a suitable candidate UE as its relay UE for communication with the base station according to the load information of the candidate UEs. For example, the first UE may select a candidate UE with the lowest load rate or select a candidate UE with a load rate lower than a load threshold as the relay UE according to the load information of the candidate UEs.

This relay UE may be a relay UE for communication with the base stations or a relay UE for communication with a satellite.

In summary, the first UE selects the relay UE according to the load information of the candidate UEs.

In some embodiments, the present disclosure provides a method for selecting a relay UE, applied to the first UE, including step S100:

S100: the load information sent by the candidate UEs is received.

In an embodiment, the load information may be used for the first UE to determine the relay UE, or may be used for the first UE to determine a timing when the first UE communicates with a corresponding candidate UE.

For example, the candidate UE broadcasts its own load information on a broadcast channel of the SL. For another example, the candidate UE carries the load information in a signaling sent during the relay UE discovery process. Thus, the first UE may receive the load information.

Before selecting the relay UE, the first UE receives the load information sent by the candidate UE. The load information may be received from the corresponding candidate UE, and may also be forwarded from another UE.

In an embodiment, the receiving the load information sent by the candidate UE includes:

receiving the load information broadcast by the candidate UEs;

and/or, receiving the load information unicast by the candidate UEs through a dedicated signaling.

For example, the candidate UE broadcasts the load information, each UE that has not established an SL connection with the candidate UE may receive the load information of the candidate UE on the broadcast channel of the SL.

For another example, if the candidate UE has established the SL connection with the first UE, the load information of the candidate UE may be multicast or unicast through the SL connection. If the candidate UE has established the SL connection with the first UE, the load information may be carried by the above dedicated signaling. Thus, the first UE receives the load information based on the dedicated signaling.

In some embodiments, the load information includes at least one of the following: an overload indication, indicating whether the candidate UE is overloaded;

a load level, indicating a level of a load of the candidate UE;

a load rate.

The overload indication may be one or a plurality of bits. In this case, the candidate UE determines whether it is overload and sends the overload indication to a UE, such as the first UE, according to whether overload occurs. If the overload indication indicates that the candidate UE is overloaded, the candidate UE may not be suitable as the relay UE for the first UE. If the overload indication indicates that the candidate UE is not overloaded, the corresponding candidate UE may be used as a relay UE for the first UE. In this way, problems such as a large communication delay of the first UE caused by the overload of the relay UE itself are reduced, and a communication quality of the first UE communicating with the base station or the satellite through the relay UE is improved.

The load level refers to an interval where the load is present, and different load levels result in different load capacities of the UE. For example, if a UE has a high load level, the corresponding candidate UE may be considered to have a high probability of overload.

The load rate may be a ratio between a current load value and a maximum load value of the candidate UE. Usually, the load rate may be a value between 0 and 1.

In an embodiment, S110 may include:

selecting, according to the load information of the candidate UEs, the relay UE from the candidate UEs whose load status meet a requirement.

In the embodiment of the present disclosure according to the load information of the candidate UEs, a candidate UE with load status that meets the requirement is selected as the relay UE.

For example, the candidate UEs whose load status meet the requirement may include a UE with the lowest load rate or a UE with a load rate lower than a preset value.

In an embodiment, the relay UE being selected from the candidate UEs according to the load information of the candidate UEs includes:

selecting, according to the load information of the candidate UEs, a third UE whose load status meets the requirement as the relay UE;

where the load status that meets the requirement includes:

an overload indication, indicating that the candidate UE is not overloaded;

a load level, indicating that a level of a load of the candidate UE is lower than a first threshold;

a load rate, indicating that a load rate of the candidate UE is lower than a second threshold.

The first threshold is a threshold of the load level, and the second threshold is a threshold of the load rate.

In an embodiment, during the process that the first UE selects the relay UE, the method for selecting the relay user equipment (UE) performed by the first UE may include:

according to the load information of the candidate UEs, a fourth UE whose load status does not meet the requirement is not selected as the relay UE;

the load status that does not meet the requirement includes:

an overload indication, indicating that the candidate UE is overloaded;

a load level, indicating that a level of a load of the candidate UE is not lower than a first threshold;

a load rate, indicating that a load rate of the candidate UE is not lower than a second threshold.

In an embodiment, the relay UE being selected from the candidate UEs according to the load information of the candidate UEs includes:

in response to that there are at least two candidate UEs whose load status differences are within a preset range and all the load status of the at least two candidate UEs meet the requirement, selecting at least one candidate UE from at least two candidate UEs whose load status meet the requirement and are identical as the relay UE according to a selection strategy.

That is, according to the load information of the candidate UEs, it is determined that there are a plurality of candidate UEs whose load status meet the requirement, i.e., when there are a plurality of candidate UEs that meet the requirement for being the relay UE, it is a preset selection strategy, and one candidate UE is selected from the plurality of candidate UEs whose load status differences are relatively small (i.e. load status differences are within the preset range) and load status meet the requirement, as the relay UE.

For example, one candidate UE is randomly selected from the plurality of candidate UEs whose load status differences are relatively small (i.e. load status differences are within the preset range) and load status meet the requirement, as the relay UE. If it is selected randomly, the selection strategy for this case is a random strategy.

It may be understood that there are various selection strategies, which may be applied to different application scenarios or meet different communication needs.

For example, the selection strategy may include at least one of the following:

a strategy of the best channel quality of the SL;

a strategy of the best channel quality of a cellular communication link;

the lowest load rate strategy;

a shortest distance strategy.

In an embodiment, that the at least one candidate UE is selected as the relay UE from at least two candidate UEs that meet the requirement and have the same load status according to the selection strategy includes at least one of the following:

selecting, based on the selection strategy, according to a channel quality of a sidelink communication (SL) between the first UE and the candidate UE, a candidate UE with the best channel quality from the at least two candidate UEs whose load status meet the requirement and are identical, as the relay UE;

selecting, based on the selection strategy, according to a channel quality of a cellular communication link between a base station and the candidate UE, a candidate UE with the best channel quality from the at least two candidate UEs whose load status meet the requirement and are identical, as the relay UE;

selecting, based on the selection strategy, according to a channel quality of a cellular communication link between a base station and the candidate UE and according to a distance between the candidate UE and the first UE, a candidate UE with the closest distance from the at least two candidate UEs whose load status meet the requirement and are identical, as the relay UE;

based on the selection strategy, selecting a candidate UE with the best channel quality from the at least two candidate UEs whose load status meet the requirement and are identical as the relay UE, and selecting a candidate UE with the lowest load level or a candidate UE with the lowest load rate from the at least two candidate UEs whose load status meet the requirement and are identical as the relay UE.

In this way, the most suitable candidate UE is selected as the relay UE by considering the load status of the candidate UEs and taking into account channel quality and/or the distance.

The strategy of the best channel quality of the SL or the strategy of the best channel quality of the cellular communication link may select a candidate UE with a sufficiently low load and good communication quality in the current communication link as the relay UE, so as to ensure the communication quality during the relay process.

In general, the shorter the distance, the better the communication quality of the SL, and the lower the probability of packet loss in the SL communication. Thus, based on the shortest distance strategy, a suitable relay UE may be selected.

In an embodiment, the load information includes: a load level;

the method further includes:

determining, according to the load level and a first threshold, whether the load status of the candidate UE meets the requirement for being the relay UE.

In another embodiment, the load information further includes: a load rate; the method further includes:

determining, according to the load rate and a second threshold, whether the load status of the candidate UE meets the requirement for being the relay UE.

The load level or the load rate of the candidate UE reflects the load status of the candidate UE. Thus, by comparing the load level or the load rate with the corresponding threshold, the first UE determines whether the load status of the candidate UE meets the requirements for being the relay UE.

In an embodiment, the method further includes:

receiving threshold information delivered by a base station;

or, determining, according to a preset configuration, threshold information;

where the threshold information is used to determine whether the load status of the candidate UE meets the requirement for being the relay UE.

The threshold information herein may be various thresholds used to determine whether the load status of the candidate UE meets the requirement for being the relay UE, such as the above first threshold, the above second threshold and/or a quality threshold.

The preset configuration may be a configuration formed by prior communication between the base station and the UE, or a configuration formed based on a communication standard.

In some embodiments, the preset configuration may be a factory configuration of the UE.

In another embodiment, the preset configuration may be a communication protocol.

In some embodiments, the method further includes:

determining, according to a channel measurement result of the SL, the candidate UE.

According the channel measurement result of the SL, a UE with sufficiently good channel quality is selected as the candidate UE.

In some embodiments, the determining, according to the channel measurement result of the SL, the candidate UE includes:

determining, according to the channel measurement result of the SL, any UE with a channel quality of the SL between the first UE and the UE greater than a quality threshold as the candidate UE.

The quality threshold may be carried in the aforementioned threshold information.

Figure 4:
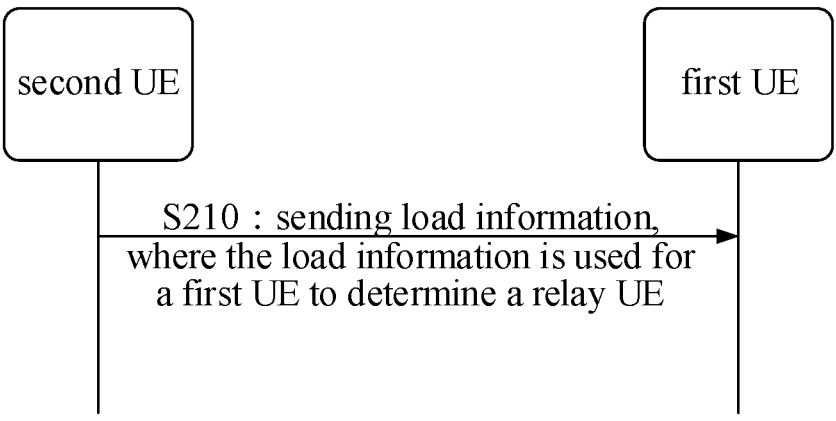
FIG. 4 is a schematic diagram of a format of a MAC RAR according to an embodiment.

As illustrated in FIG. 4, the embodiment of the present disclosure provides a method for processing information, where the method is applied to a second UE, and includes step S210:

S210: load information is sent, where the load information is used for a first UE to determine a relay UE.

The method for determining the relay UE provided in the embodiment of the present disclosure is applied to a second UE, and the second UE may be a candidate UE for the relay UE of the first UE.

The second UE transmits the load information of the second UE, for example, sending the load information in broadcast, multicast, or unicast.

The second UE described in the embodiment of the present disclosure may be: a UE located around the first UE, for example, any candidate UE mentioned above or a UE that may be used as a candidate UE.

In the embodiment of the present disclosure, the sent load information of the second UE may be at least used for the first UE to determine the relay UE. Of course, the load information may also be used for determining a timing when the SL communication is performed with the first UE, and the like.

Figure 5:
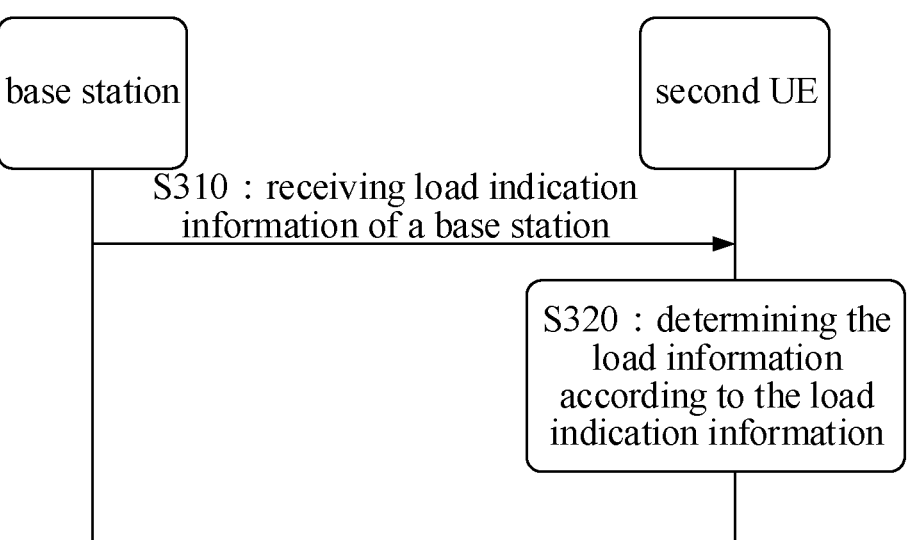
FIG. 5 is a flowchart of a method for processing information according to an embodiment.

As illustrated in FIG. 5, the embodiment of the present disclosure provides the method for processing information, where the method is applied to a second UE, and includes steps S310 and S320:

S310: receiving load indication information of a base station;

S320: determining the load information according to the load indication information.

The load information of the second UE may involve load status of the SL and/or load status of a cellular communication link.

The base station may determine the load status of the second UE on the cellular communication link according to the amount of data delivered to the UE and the like. Thus, the base station may send load indication information to the second UE.

In an embodiment, the UE may estimate its own load information according to a model.

In an embodiment, the method further includes:

obtaining a measurement result by measuring a transmission link;

determining, according to the measurement result, the load information.

For example, communication qualities of current cellular communication link and the SL may be determined according to channel measurement, and the communication qualities reflect the load status of the second UE, so as to determine the load information according to the measurement result.

In an embodiment, the determining, according to the measurement result, the load information includes:

determining, according to a measurement result of a SL, the load information;

and/or, determining, according to a measurement result of a cellular communication link between the second UE and a base station, the load information.

For example, the measurement result of the cellular communication link is obtained through the measurement of a reference signal sent by the base station; the measurement result of the SL is obtained by listening to the SL.

The measurement result includes but is not limited to: a Reference Signal Receiving Power (RSRP) or a Reference Signal Received Quality (RSRQ) of the cellular communication link.

In some embodiments, the determining, according to the measurement result of the SL, the load information, includes:

determining, according to a channel busy ratio (CBR) of the SL, the load information;

and/or, determining, according to a channel occupancy ratio (CR) of the SL, the load information.

The channel busy ratio of the SL (Sidelink channel busy ratio, SL CBR) is a measurement result that is obtained by UE within a time window according to a signal reception strength on the SL channel, and is used to adjust a sending parameters of the UE, such as a sending power and/or priority setting of a SL signal. If the CBR is high, the UE reduces a sending power and the sending of low-priority data.

The channel occupancy ratio of the SL (Sidelink channel occupancy ratio, SL CR) is a ratio of the sidelink sending resource occupied by the UE itself to total sidelink channel resources of the sidelink.

The UE may map a CR upper limit according to a measured CBR, and when the UE selects the SL sending resource, its own CR cannot exceed the CR upper limit. If the CR upper limit is relatively high, more SL sending resources are available for selection; otherwise, fewer SL sending resources are available for selection.

For example, comparing the CBR with the CBR threshold, if the CBR of the candidate UE is less than or equal to the CBR threshold, it may be considered that the second UE is not overloaded, otherwise it may be considered that the second UE is overloaded.

For another example, when comparing CR with the CR threshold, if the CR of the candidate UE is less than or equal to the CR threshold, it may be considered that the second UE is not overloaded, otherwise it may be considered that the candidate UE is overloaded.

In an embodiment, the sending the load information of the candidate UE includes: sending the load information of the candidate UE in broadcast; and/or, unicasting the load information of the candidate UE through a dedicated signaling.

The CR threshold and the CBR threshold here may be delivered by the base station or determined by the second UE based on pre-configuration.

As illustrated in FIG. 4, the embodiment of the present disclosure provides a method for processing information, where the method is applied to a second UE and includes step S210:

S210: sending load information, wherein the load information is used for a first UE to determine a relay UE.

Figures 6, 7, 8, 9:
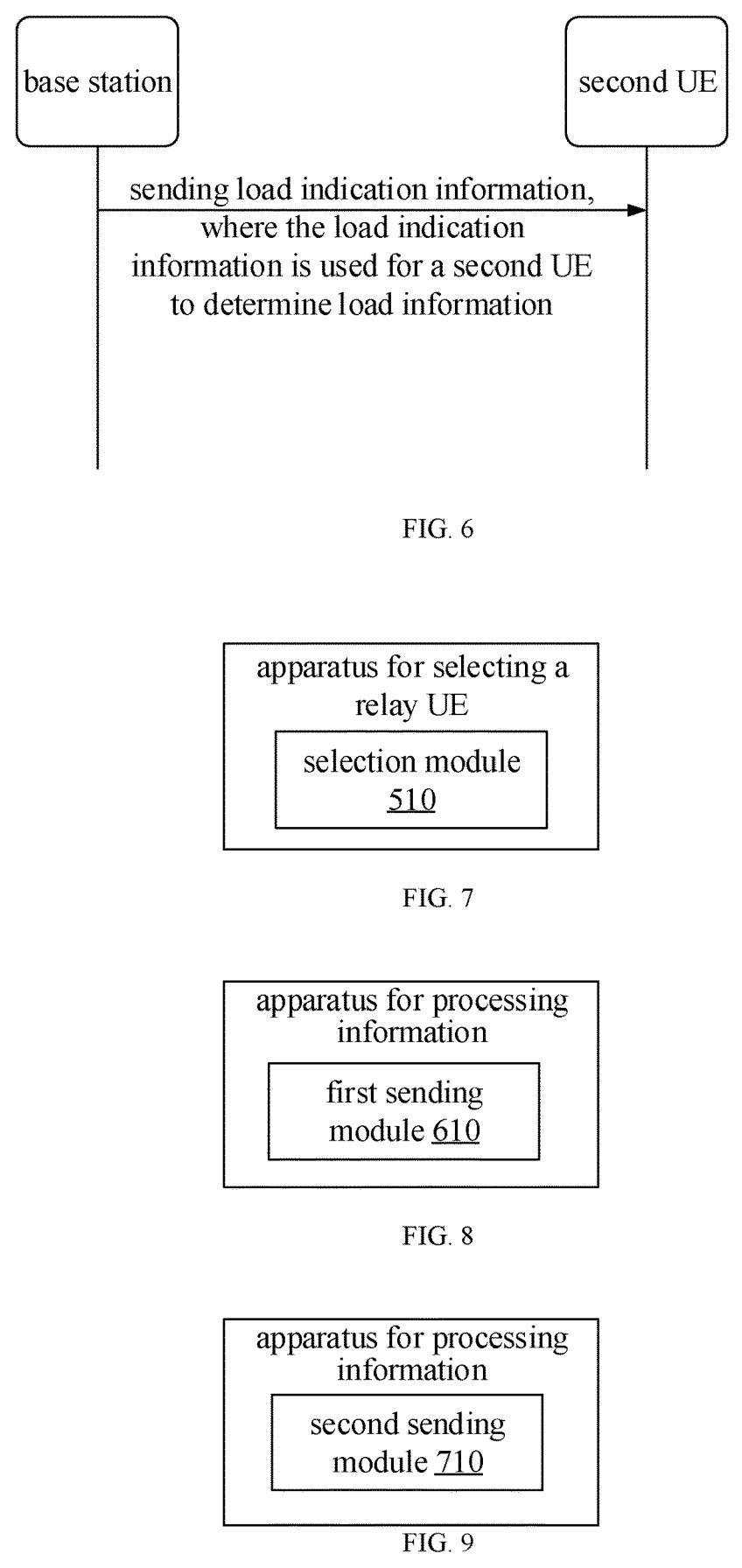

As illustrated in FIG. 6, the embodiment of the present disclosure provides a method for processing information applied to a base station, and the method further includes:

S410: sending load indication information, where the load indication information is used for a second UE to determine load information.

In an embodiment, the load information is used for the first UE to determine a relay UE, and in another embodiment, the load information may also be used for the second UE to determine its own load status, thereby scheduling its own resource, and the like.

In an embodiment, the method further includes:

delivering threshold information, where the threshold information is used to determine whether load status of the second UE meets a requirement for being the relay UE.

For example, the base station may determine the load status of the second UE on the cellular communication link according to current amount of data that needs to be delivered to the second UE, and deliver the load indication information to the second UE according to the load status.

For another example, the base station may determine the load status corresponding to the second UE on the cellular communication link in combination with business requirements and/or the measurement result of the UE on the cellular communication link, and then deliver the load indication information according to the determined load status.

In some embodiments, the threshold information includes at least one of the following:

a first threshold for determining the load status of the second UE by comparing the first threshold with a load level of the second UE;

a second threshold for determining the load status of the second UE by comparing the second threshold with a load rate of the second UE;

a quality threshold for the first UE to determine a candidate UE;

a CBR threshold for the second UE to determine the load information by comparing the CBR threshold with a CBR of a SL;

a CR threshold for the second UE to determine the load information by comparing the CR threshold with a CR of a SL.

The threshold information delivered by the base station may include any one of the above-mentioned thresholds.

The threshold information may be delivered to the first UE or to the second UE.

As illustrated in FIG. 7, the embodiment of the present disclosure provides an apparatus for selecting a relay UE, which applied to a first UE and includes:

a selection module 510 configured to select the relay UE from candidate UEs according to load information of the candidate UEs.

In an embodiment, the apparatus for selecting the relay UE includes the selection module 510. The selection module 510 may be a program module, when executed by a processor, the program module may select a suitable relay UE as its own relay node from the candidate UEs according to the load information of the candidate UEs.

In another embodiment, the selection module 510 may be a combination of soft and hard modules, which includes, but is not limited to, a programmable array. The programmable array includes, but is not limited to a field programmable array or a complex programmable array.

In some embodiments, the selection module 510 may further include: a hardware-only module. The hardware-only module includes, but is not limited to: a specialized integrated circuit.

In some embodiments, the apparatus further includes:

a first receiving module configured to receive the load information sent by the candidate UEs.

In some embodiments, the first receiving module is configured to receive the load information broadcast by the candidate UEs; and, receive the load information unicast by the candidate UEs through a dedicated signaling.

In some embodiments, the load information includes at least one of the following:

an overload indication, indicating whether the candidate UE is overloaded;

a load level, indicating a level of a load of the candidate UE;

a load rate.

In some embodiments, the selection module 510 is configured to select the relay UE from the candidate UEs whose load status meet a requirement according to the load information of the candidate UEs.

In some embodiments, the selection module 510 is configured to select the third UE whose load status meets a requirement as the relay UE according to the load information of the candidate UEs;

where the load status meeting the requirement includes:

an overload indication, indicating that the candidate UE is not overloaded;

a load level, indicating that a level of a load of the candidate UE is lower than a first threshold;

a load rate, indicating that a load rate of the candidate UE is lower than a second threshold.

In some embodiments, the selection module 510 is also configured to not select a fourth UE whose load status does not meet the requirement as the relay UE according to the load information of the candidate UEs;

the load status that does not meet the requirement includes:

an overload indication, indicating that the candidate UE is overloaded;

a load level, indicating that a level of a load of the candidate UE is not lower than a first threshold;

a load rate, indicating that a load rate of the candidate UE is not lower than a second threshold.

In some embodiments, the selection module 510 is configured to, in response to that there are at least two candidate UEs whose load status differences are within a preset range and all the load status of the at least two candidate UEs meet the requirement, select at least one candidate UE from at least two candidate UEs whose load status meet the requirement and are identical as the relay UE according to a selection strategy.

In some embodiments, the selection module 510 is configured to perform one of the following operations:

selecting, based on the selection strategy, according to a channel quality of a sidelink communication (SL) between the first UE and the candidate UE, a candidate UE with the best channel quality from the at least two candidate UEs whose load status meet the requirement and are identical, as the relay UE;

selecting, based on the selection strategy, according to a channel quality of a cellular communication link between a base station and the candidate UE, a candidate UE with the best channel quality from the at least two candidate UEs whose load status meet the requirement and are identical, as the relay UE;

selecting, based on the selection strategy, according to a channel quality of a cellular communication link between a base station and the candidate UE and according to a distance between the candidate UE and the first UE, a candidate UE with the closest distance from the at least two candidate UEs whose load status meet the requirement and are identical, as the relay UE;

based on the selection strategy, selecting a candidate UE with the best channel quality from the at least two candidate UEs whose load status meet the requirement and are identical as the relay UE, and selecting a candidate UE with the lowest load level or a candidate UE with the lowest load rate from the at least two candidate UEs whose load status meet the requirement and are identical, as the relay UE.

In some embodiments, the load information includes: a load level;

the apparatus further includes:

a first determination module, configured to determine, according to the load level and a first threshold, whether the load status of the candidate UE meets the requirement for being the relay UE;

or, the load information includes: a load rate;

a second determination module, configured to determine, according to the load rate and a second threshold, whether the load status of the candidate UE meets the requirement for being the relay UE.

In some embodiment, the apparatus further includes:

a second receiving module configured to receive threshold information delivered by a base station;

or, a third determination module configured to determine threshold information according to a preset configuration;

where the threshold information is used to determine whether the load status of the candidate UE meets the requirement for being the relay UE.

In some embodiment, the apparatus further includes:

a fourth determination module configured to determine, according to a channel measurement result of a SL, the candidate UE.

In some embodiment, the fourth determination module is configured to determine according to the channel measurement result of the SL, any UE with a channel quality of the SL between the first UE and the UE greater than a quality threshold as the candidate UE.

As illustrated in FIG. 8, the embodiment of the present disclosure provides an apparatus for processing information, where the apparatus is applied to a second UE and includes:

a first sending module 610, configured to send load information, where the load information is used for a first UE to determine a relay UE.

In some embodiments, the first sending module 610 may include a program module, when executed by a processor, the program module may send the load information of the second UE.

In another embodiments, the first sending module 610 may be a combination of soft and hard modules, which includes, but is not limited to, a programmable array. The programmable array includes, but is not limited to a field programmable array or a complex programmable array.

In some embodiments, the first sending module 610 may further include: a hardware-only module. The hardware-only module includes, but is not limited to: a specialized integrated circuit.

In some embodiments, the apparatus further includes:

a third receiving module configured to receive load indication information of a base station;

a fifth determination module configured to determine the load information according to the load indication information.

It may be understood that the apparatus further includes:

a measurement module is configured to obtain a measurement result by measuring a transmission link;

a sixth determination module is configured to determine, according to the measurement result, the load information.

It may be understood that the sixth determination module is configured to determine the load information according to a measurement result of a SL; and/or, determine the load information according to a measurement result of a cellular communication link between the second UE and a base station.

It may be understood that the sixth determination module is configured to determine the load information according to a channel busy ratio (CBR) of the SL; and/or, determine the load information according to a channel occupancy ratio (CR) of the SL.

It may be understood that the sending module is configured to send the load information in broadcast; and/or unicast the load information through a dedicated signaling.

As illustrated in FIG. 9, the embodiment of the present disclosure provides an apparatus for processing information, which is applied to a base station and includes:

a second sending module 710 configured to send load indication information, where the load indication information is used for a second UE to determine load information, and the load information is used for a first UE to determine a relay UE.

In some embodiments, the second sending module 710 may include a program module, when executed by a processor, the program module may send the load indication information to the UE.

In another embodiments, the second sending module 710 may be a combination of soft and hard modules, which includes, but is not limited to, a programmable array. The programmable array includes, but is not limited to a field programmable array or a complex programmable array.

In some embodiments, the second sending module 710 may further include: a hard-ware-only module. The hard-ware-only module includes, but is not limited to: a specialized integrated circuit.

In an embodiment, the second sending module 710 is further configured to deliver threshold information, where the threshold information is used to determine whether load status of the second UE meets a requirement for being the relay UE.

In an embodiment, the threshold information includes at least one of the following;

a first threshold for determining the load status of the second UE by comparing the first threshold with a load level of the second UE;

a second threshold for determining the load status of the second UE by comparing the second threshold with a load rate of the second UE;

a quality threshold for the first UE to determine a candidate UE;

a CBR threshold for the second UE to determine the load information by comparing the CBR threshold with a CBR of a SL;

a CR threshold for the second UE to determine the load information by comparing the CR threshold with a CR of a SL.

The embodiment of the present disclosure provides a communication device, including:

a memory used to store an instruction which may be executed by a processor;

the processor connected with the memory;

where the processor is configured to execute the method provided by any of the aforementioned technical solutions.

The processor may include various types of storage medium. The storage medium are non-transitory computer storage medium that may continuously perform memory storage of the information thereon after the communication device is powered off.

The communication device herein may be the above base station or the first UE or the second UE.

The processor may be connected to the memory through a bus or the like, and configured to read an executable program stored on the memory. For example, the processor may execute at least one of any method shown in FIGS. 2, 3A, 3B, and 4 to 6.

When a plurality of relay UEs are available, the remote UE selects the best relay UE according to the signal strength. However, if the load on the relay UE is too high, the relay UE rejects the new remote UE, causing the establishment of the relay connection to fail and delay. Currently, there is no mechanism to evaluate the load of the relay UE.

The embodiment of the present disclosure provides a method for selecting a relay UE based on load status, such that the remote UE considers the load when selecting the relay UE, and proposes a solution for determining the load of the relay UE.

A candidate UE (also known as an optional UE or an alternative UE) that may serve as the relay UE determines its own load status and send its load status to the remote UE through the sidelink.

The load status may be either an overload indication indicating whether it is overloaded or a load level.

It may be sent to the remote UE in broadcast or through a dedicated signaling.

It may be understood that the base station may send an indication to the UE, and the UE determines the load status according to the indication.

It may be understood, the base station may send threshold information to the UE. UE determines the load status according to the threshold information.

It may be understood, the UE may compare a measurement result of the SL with the threshold and determine the load status according to a result of the comparison.

The measurement result of the channel measurement of the SL may be either CBR or CR.

In an embodiment, after receiving the load status of the relay UE, the remote UE determines how to select the relay UE according to the load status.

In an embodiment, among the optional relay UEs, the remote UE does not select the relay UE with a high load.

In an embodiment, among the optional relay UEs, the remote UE selects the relay UE with a low load.

In an embodiment, when all optional relay UEs have the same load status, the remote UE selects one based on implementation.

In an embodiment, the remote UE determines which relay UE is an optional relay UE according to the channel measurement result of the relay UE. Whether the relay UE is optional is determined by comparing the channel measurement result with a threshold.

The channel measurement result may be RSRP or RSRQ of the SL.

In an embodiment, the remote UE determines whether the load of the relay UE is high or low according to the comparison between the load level and the threshold. In an embodiment, the threshold may be provided by the base station or determined based on pre-configuration.

Figure 10:
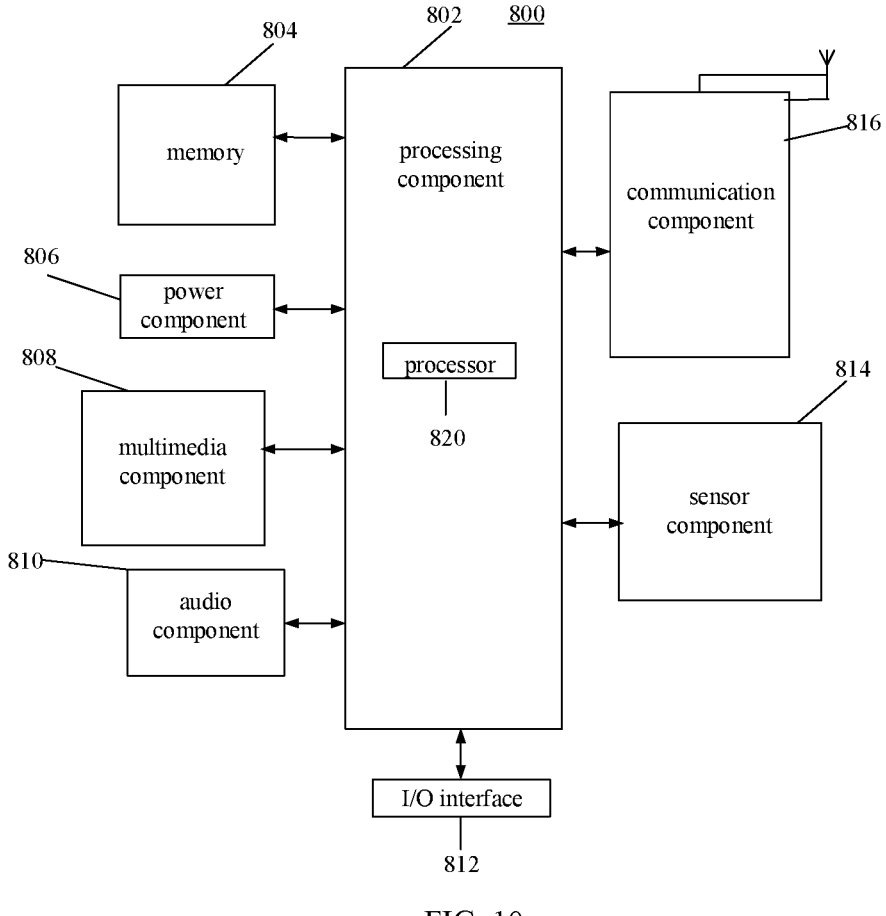
FIG. 10 is a structural diagram a UE according to an embodiment.

FIG. 10 is a block diagram illustrating a user equipment (UE) 800 according to an embodiment. For example, the UE 800 may be a mobile phone, a computer, a digital broadcasting terminal, a message transceiving equipment, a game console, a tablet equipment, a medical equipment, a fitness equipment, or a personal digital assistant.

As illustrated in FIG. 10, the UE 800 may include one or more of a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 802 for executing instructions to implement all or a part of the above method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any application or method operated on the UE 800 for performing contraction data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 is configured to provide power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. When the UE 800 is in an operation mode, such as a shooting mode or a video mode, the front camera and/or the rear camera may receive external multimedia data. Each front camera and rear camera may be a fixed optical lens system or have a focal length and an optical zoom capability.

The audio component 810 is configured to output and/or input an audio signal. For example, the audio component 810 includes a microphone ("MIC") for receiving an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting the audio signal.

The I/O interface 812 is configured to provide an interface between the processing component 802 and peripheral interface modules, such as a keyboard, a click wheel, buttons, and the like. These buttons may include, but be not limited to, a home button, a volume button, a start button, and a lock button.

The sensor component 814 includes one or more sensors for providing status assessments of various aspects of the UE 800. For example, the sensor component 814 may detect an open/closed state of the UE 800, relative positioning of components, e.g., the display and the keypad of the UE 800, a position change of the UE 800 or a component of the UE 800, a presence or absence of user contraction with the UE 800, an orientation or an acceleration/deceleration of the UE 800, and a temperature change of the UE 800. The sensor component 814 may include a proximity sensor configured to detect the presence of nearby objects without any physical contact. The sensor component 814 may also include an optical sensor, such as a CMOS or CCD image sensor, for use in an imaging application. In some embodiments, the sensor component 214 may also include an acceleration sensor, a gyro sensor, a magnetic sensor, a pressure sensor or a temperature sensor.

The communication component 816 is configured to facilitate communication, wired or wirelessly, between the UE 800 and other devices. The UE 800 may access a wireless network based on a communication standard, such as Wi-Fi, 2G, 3G, or a combination thereof. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, there is also provided a non-transitory computer readable storage medium including instructions, such as the memory 804 including the instructions. The instructions may be executed by the processor 820 in the UE 800 for performing the above method. For example, the non-transitory computer readable storage medium may be a ROM, a RAM, a CD-ROM, a magnetic tape, a floppy disc, an optical data storage device, and the like.

Figure 11:
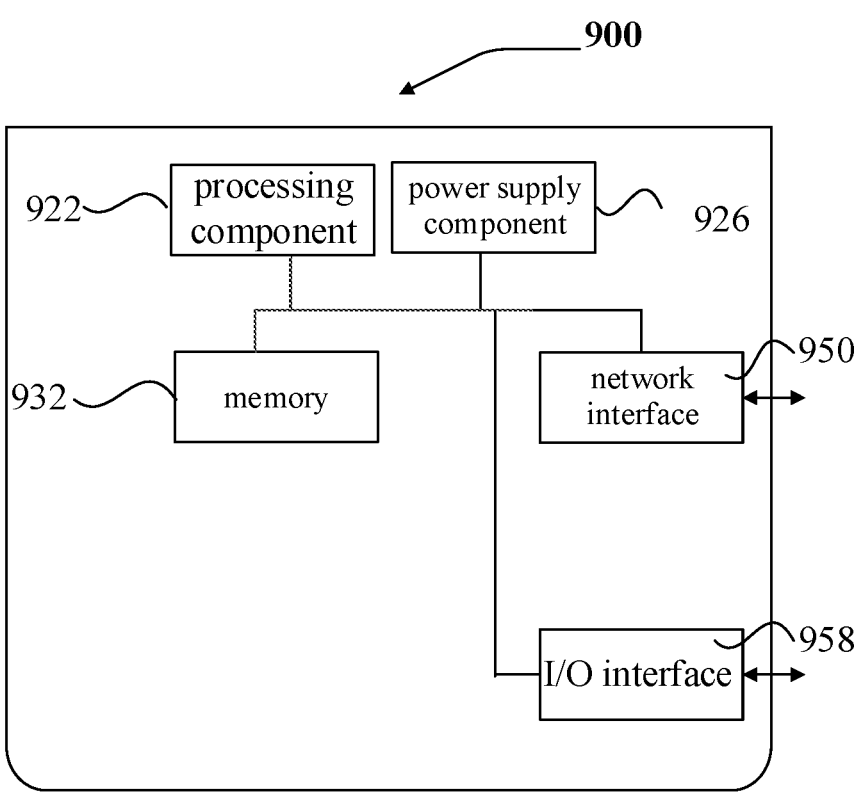
FIG. 11 is a structural diagram of a base station according to an embodiment.

FIG. 11 is a block diagram illustrating a base station according to an embodiment of the present disclosure. For example, the base station 900 may be provided as a network device. Referring to FIG. 11, the base station 900 includes a processing component 922, which further include one or more processors, and memory resources represented by the memory 932, which are configured to store instructions executed by the processing component 922, for example, an application. The applications stored in the memory 932 may include one or more modules each of which corresponds to a set of instructions. In addition, the processing component 922 is configured to execute instructions, to execute any of the above methods applied to the base station, such as the method shown in FIGS. 2, 3, 9 and/or 10.

The base station 900 may further include one power supply component 926 configured to execute power management of the base station 900, and one wired or wireless network interface 950 configured to connect the base station 900 to a network, and one input/output (I/O) interface 958. The base station 900 may operate an operating system stored in the memory 932, for example, Windows Server™, Mac OS X™, Unix™, Linux™, FreeBSD™, or the like.

According to a first aspect of the present disclosure, a method for selecting a relay user equipment (UE) is provided, applied to a first UE, and includes:

selecting, according to load information of candidate UEs, the relay UE from the candidate UEs.

In some embodiments, the method further includes:

receiving the load information sent by the candidate UEs.

In some embodiments, the receiving the load information sent by the candidate UEs includes at least one of the following:

receiving the load information broadcast by the candidate UEs; or, receiving the load information unicast by the candidate UEs through a dedicated signaling.

In some embodiments, the load information includes at least one of the following:

an overload indication, indicating whether the candidate UE is overloaded;

a load level, indicating a level of a load of the candidate UE;

a load rate.

In some embodiments, the selecting, according to the load information of the candidate UEs, the relay UE from the candidate UEs includes:

selecting, according to the load information of the candidate UEs, the relay UE from the candidate UEs whose load status meet a requirement.

In some embodiments, the selecting, according to the load information of the candidate UEs, the relay UE from the candidate UEs whose load status meet the requirement includes:

selecting, according to the load information of the candidate UEs, a third UE whose load status meets the requirement as the relay UE;

where the load status meeting the requirement includes:

an overload indication, indicating that the candidate UE is not overloaded;

a load level, indicating that a level of a load of the candidate UE is lower than a first threshold;

a load rate, indicating that a load rate of the candidate UE is lower than a second threshold.

In some embodiments, the selecting, according to the load information of the candidate UEs, the relay UE from the candidate UEs whose load status meet the requirement includes:

selecting, in response to that there are at least two candidate UEs whose load status differences are within a preset range and all the load status of the at least two candidate UEs meet the requirement, according to a selection strategy, at least one candidate UE from at least two candidate UEs whose load status meet the requirement and are identical, as the relay UE.

In some embodiments, the selecting, according to the selection strategy, the at least one candidate UE from the at least two candidate UEs whose load status meet the requirement and are identical as the relay UE includes one of the following:

selecting, based on the selection strategy, according to a channel quality of a sidelink communication (SL) between the first UE and the candidate UE, a candidate UE with a best channel quality from the at least two candidate UEs whose load status meet the requirement and are identical, as the relay UE;

selecting, based on the selection strategy, according to a channel quality of a cellular communication link between a base station and the candidate UE, a candidate UE with a best channel quality from the at least two candidate UEs whose load status meet the requirement and are identical, as the relay UE;

selecting, based on the selection strategy, according to a channel quality of a cellular communication link between a base station and the candidate UE and according to a distance between the candidate UE and the first UE, a candidate UE with a closest distance from the at least two candidate UEs whose load status meet the requirement and are identical, as the relay UE;

based on the selection strategy, selecting a candidate UE with a best channel quality from the at least two candidate UEs whose load status meet the requirement and are identical as the relay UE, and selecting a candidate UE with a lowest load level or a candidate UE with a lowest load rate from the at least two candidate UEs whose load status meet the requirement and are identical, as the relay UE.

In some embodiments, the load information includes: a load level, the method further includes:

determining, according to the load level and a first threshold, whether the load status of the candidate UE meets the requirement for being the relay UE;

or, where the load information includes: a load rate; the method further includes:

determining, according to the load rate and a second threshold, whether the load status of the candidate UE meets the requirement for being the relay UE.

In some embodiments, the method further includes:

receiving threshold information delivered by a base station;

or, determining, according to a preset configuration, threshold information;

where the threshold information is used to determine whether the load status of the candidate UE meets the requirement for being the relay UE.

In some embodiments, the method further includes:

determining, according to a channel measurement result of a sidelink communication (SL), the candidate UE.

In some embodiments, the determining, according to the channel measurement result of the SL, the candidate UE includes:

determining, according to the channel measurement result of the SL, any UE with a channel quality of the SL between the first UE and the UE greater than a quality threshold as the candidate UE.

According to a second aspect of the present disclosure, a method for processing information is provided, applied to a second user equipment (UE), and includes:

sending load information, where the load information is used for a first UE to determine a relay UE.

In some embodiments, the method further includes:

receiving load indication information of a base station; and determining, according to the load indication information, the load information.

In some embodiments, the method further includes:

obtaining a measurement result by measuring a transmission link;

determining, according to the measurement result, the load information.

In some embodiments, the determining, according to the measurement result, the load information includes at least one of:

determining, according to a measurement result of a sidelink communication (SL), the load information; or determining, according to a measurement result of a cellular communication link between the second UE and a base station, the load information.

In some embodiments, the determining, according to the measurement result, the load information includes:

determining, according to a measurement result of a sidelink communication (SL), the load information;

where the determining, according to the measurement result of the SL, the load information, includes at least one of the following:

determining, according to a channel busy ratio (CBR) of the SL, the load information; or determining, according to a channel occupancy ratio (CR) of the SL, the load information.

In some embodiments, the sending the load information includes at least one of the following:

sending the load information in broadcast; or unicasting the load information through a dedicated signaling.

According to a third aspect of the present disclosure, a method for processing information, applied to a base station, and includes:

sending load indication information, where the load indication information is used for a second user equipment (UE) to determine load information, and the load information is used for a first UE to determine a relay UE.

In some embodiments, the method further includes:

delivering threshold information, where the threshold information is used to determine whether load status of the second UE meets a requirement for being the relay UE.

In some embodiments, the threshold information includes at least one of the following;

a first threshold for determining the load status of the second UE by comparing the first threshold with a load level of the second UE;

a second threshold for determining the load status of the second UE by comparing the second threshold with a load rate of the second UE;

a quality threshold for the first UE to determine a candidate UE;

a channel busy ratio (CBR) threshold for the second UE to determine the load information by comparing the CBR threshold with a CBR of a sidelink communication (SL); or a channel occupancy ratio (CR) threshold for the second UE to determine the load information by comparing the CR threshold with a CR of a sidelink communication (SL).

According to a fourth aspect of the present disclosure, an apparatus for selecting a relay user equipment (UE) is provided, applied to a first UE, and includes:

a selection module, configured to select the relay UE from candidate UEs according to load information of the candidate UEs.

In some embodiments, the apparatus further includes:

a first receiving module configured to receive the load information sent by the candidate UEs.

In some embodiments, the first receiving module is configured to receive the load information broadcast by the candidate UEs; and/or, receive the load information unicast by the candidate UEs through a dedicated signaling.

In some embodiments, the load information includes at least one of the following:

an overload indication, indicating whether the candidate UE is overloaded;

a load level, indicating a level of a load of the candidate UE;

a load rate.

In some embodiments, the selection module is configured to select the relay UE from the candidate UEs whose load status meet a requirement according to the load information of the candidate UEs.

In some embodiments, the selection module is configured to select, in response to that there are at least two candidate UEs whose load status differences are within a preset range and all the load status of the at least two candidate UEs meet the requirement, according to a selection strategy, at least one candidate UE from at least two candidate UEs whose load status meet the requirement and are identical as the relay UE.

According to a fifth aspect of the present disclosure, an apparatus for processing information is provided, applied to a second UE, and includes:

a first sending module configured to send load information, where the load information is used for a first UE to determine a relay UE.

In some embodiments, the apparatus further includes:

a third receiving module configured to receive load indication information of a base station;

a fifth determination module configured to determine the load information according to the load indication information.

According to a sixth aspect of the present disclosure, an apparatus for processing information is provided, applied to a base station, and includes:

a second sending module configured to send load indication information, where the load indication information is used for a second UE to determine load information, and the load information is used for a first UE to determine a relay UE.

In some embodiments, the second sending module is further configured to deliver threshold information, where the threshold information is used to determine whether load status of the second UE meets a requirement for being the relay UE.

According to a seventh aspect of the present disclosure, a communication device is provided, including a processor, a transceiver, a memory, and an executable program stored in the memory and capable of running on the processor, where the processor is configured to implement the method according to any one of the above embodiments when running the executable program.

According to an eighth aspect of the present disclosure, a non-transitory computer storage medium having an executable program stored thereon is provided, where when the executable program is executed by the processor, the method according to any one of the above embodiments is implemented.

The technical solution provided by the embodiments of the present disclosure is that the first UE selects the relay UE according to the load status of the candidate UEs. In this way, the UE with a relatively low load rate may be selected as the relay UE, thereby reducing communication problems such as large communication delay of the relayed remote UE or communication interruption due to the high load of the relay UE itself, and improving communication quality.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for selecting a relay user equipment (UE), performed by a first UE, comprising:

selecting, according to load information of candidate UEs, a relay UE from the candidate UEs;

wherein the load information is determined by the candidate UE based on measurement result of sidelink communication (SL) and load indication information;

wherein the measurement result of the SL is obtained by the candidate UE by measuring a transmission link, and the measurement result of the SL comprises at least one of a channel busy ratio (CBR) of the SL or a channel occupancy ratio (CR) of the SL; and wherein the load indication information is sent by a base station to the candidate UE, and the load indication information is configured to indicate a load status of a cellular communication link between the candidate UE and the base station;

wherein selecting, according to the load information of the candidate UEs, the relay UE from the candidate UEs comprises:

selecting, according to the load information of the candidate UEs, the relay UE from the candidate UEs whose load status meets a requirement, wherein the load status meeting the requirement comprises at least one of:

an overload indication, indicating that the candidate UE is not overloaded;

a load level, indicating that a level of a load of the candidate UE is lower than a first threshold; or a load rate, indicating that a load rate of the candidate UE is lower than a second threshold; and determining that there are at least two candidate UEs whose load status meets the requirement, and selecting a candidate UE with a lowest load level or a lowest load rate as the relay UE.

2. The method according to claim 1, further comprising:

receiving the load information sent by the candidate UEs.

3. The method according to claim 2, wherein receiving the load information sent by the candidate UEs comprises at least one of following acts:

receiving the load information broadcast by the candidate UEs; or, receiving the load information unicast by the candidate UEs through a dedicated signaling.

4. The method according to claim 1, wherein the load information comprises at least one of the following:

the overload indication, indicating whether the candidate UE is overloaded;

the load level, indicating the level of the load of the candidate UE; or the load rate.

5. The method according to claim 1, wherein selecting, according to the load information of the candidate UEs, the relay UE from the candidate UEs whose load status meet the requirement comprises:

selecting, according to the load information of the candidate UEs, a third UE whose load status meets the requirement as the relay UE.

6. The method according to claim 1, wherein the selecting, according to the load information of the candidate UEs, the relay UE from the candidate UEs whose load status meet the requirement comprises:

selecting, in response to determining that there are at least two candidate UEs whose load status differences are within a preset range and all the load status of the at least two candidate UEs meet the requirement, according to a selection strategy, at least one candidate UE from at least two candidate UEs whose load status meet the requirement and are identical, as the relay UE.

7. The method according to claim 6, wherein selecting, according to the selection strategy, the at least one candidate UE from the at least two candidate UEs whose load status meet the requirement and are identical as the relay UE comprises one of following acts:

selecting, based on the selection strategy, according to a channel quality of the SL between the first UE and the candidate UE, a candidate UE with a best channel quality from the at least two candidate UEs whose load status meet the requirement and are identical, as the relay UE;

selecting, based on the selection strategy, according to a channel quality of a cellular communication link between the base station and the candidate UE, a candidate UE with a best channel quality from the at least two candidate UEs whose load status meet the requirement and are identical, as the relay UE;

selecting, based on the selection strategy, according to a channel quality of a cellular communication link between the base station and the candidate UE and according to a distance between the candidate UE and the first UE, a candidate UE with a closest distance from the at least two candidate UEs whose load status meet the requirement and are identical, as the relay UE; or based on the selection strategy, selecting a candidate UE with a best channel quality from the at least two candidate UEs whose load status meet the requirement and are identical as the relay UE.

8. The method according to claim 6, wherein the load information comprises: the load level, the method further comprises:

determining, according to the load level and the first threshold, whether the load status of the candidate UE meets the requirement for being the relay UE;

or, wherein the load information comprises: the load rate; the method further comprises:

determining, according to the load rate and the second threshold, whether the load status of the candidate UE meets the requirement for being the relay UE.

9. The method according to claim 1, further comprising:

receiving threshold information delivered by the base station;

or, determining, according to a preset configuration, threshold information;

wherein the threshold information is used to determine whether the load status of the candidate UE meets the requirement for being the relay UE.

10. The method according to claim 1, further comprising:

determining, according to a channel measurement result of the SL, the candidate UE.

11. The method according to claim 10, wherein determining, according to the channel measurement result of the SL, the candidate UE comprises:

determining, according to the channel measurement result of the SL, any UE which makes the SL with the first UE with a channel quality greater than a quality threshold, as the candidate UE.

12. A communication device comprising a processor, a transceiver, a memory, and an executable program stored in the memory and capable of running on the processor, wherein the processor is configured to select, according to load information of candidate UEs, a relay UE from the candidate UEs;

wherein the load information is determined by the candidate UE based on a measurement result of sidelink communication (SL) and load indication information;

wherein the measurement result of the SL is obtained by the candidate UE by measuring a transmission link, and the measurement result of the SL comprises at least one of a channel busy ratio (CBR) of the SL or a channel occupancy ratio (CR) of the SL; and wherein the load indication information is sent by a base station to the candidate UE, and the load indication information is configured to indicate a load status of a cellular communication link between the candidate UE and the base station;

wherein the processor is further configured to:

select, according to the load information of the candidate UEs, the relay UE from the candidate UEs whose load status meets a requirement, wherein the load status meeting the requirement comprises at least one of:

an overload indication, indicating that the candidate UE is not overloaded;

a load level, indicating that a level of a load of the candidate UE is lower than a first threshold; or a load rate, indicating that a load rate of the candidate UE is lower than a second threshold; and determine that there are at least two candidate UEs whose load status meets the requirement, and select a candidate UE with a lowest load level or a lowest load rate as the relay UE.

13. The communication device according to claim 12, wherein the processor is further configured to:

receive the load information sent by the candidate UEs.

14. The communication device according to claim 13, wherein the processor is further configured to receive the load information sent by the candidate UEs by at least one of:

receiving the load information broadcast by the candidate UEs; or, receiving the load information unicast by the candidate UEs through a dedicated signaling.

15. The communication device according to claim 12, wherein the load information comprises at least one of the following:

the overload indication, indicating whether the candidate UE is overloaded;

the load level, indicating the level of the load of the candidate UE; or the load rate.

16. The communication device according to claim 12, wherein the processor is further configured to:

select, according to the load information of the candidate UEs, a third UE whose load status meets the requirement as the relay UE.

17. The communication device according to claim 12, wherein the processor is further configured to:

select, in response to determining that there are at least two candidate UEs whose load status differences are within a preset range and all the load status of the at least two candidate UEs meet the requirement, according to a selection strategy, at least one candidate UE from at least two candidate UEs whose load status meet the requirement and are identical, as the relay UE.

18. The communication device according to claim 17, wherein the processor is further configured to select, according to the selection strategy, the at least one candidate UE from the at least two candidate UEs whose load status meet the requirement and are identical as the relay UE by one of the following acts:

selecting, based on the selection strategy, according to a channel quality of the SL between a first UE and the candidate UE, a candidate UE with a best channel quality from the at least two candidate UEs whose load status meet the requirement and are identical, as the relay UE;

selecting, based on the selection strategy, according to a channel quality of a cellular communication link between the base station and the candidate UE, a candidate UE with a best channel quality from the at least two candidate UEs whose load status meet the requirement and are identical, as the relay UE;

selecting, based on the selection strategy, according to a channel quality of a cellular communication link between the base station and the candidate UE and according to a distance between the candidate UE and the first UE, a candidate UE with a closest distance from the at least two candidate UEs whose load status meet the requirement and are identical, as the relay UE; or based on the selection strategy, selecting a candidate UE with a best channel quality from the at least two candidate UEs whose load status meet the requirement and are identical as the relay UE.

19. The communication device according to claim 12, wherein the load information comprises: the load level, and the processor is further configured to:

determine, according to the load level and the first threshold, whether the load status of the candidate UE meets the requirement for being the relay UE;

or wherein the load information comprises: the load rate; and the processor is further configured to:

determine, according to the load rate and the second threshold, whether the load status of the candidate UE meets the requirement for being the relay UE.

20. A communication system, comprising: a first UE, candidate UEs and a base station;

wherein the first UE is configured to:

select, according to load information of candidate UEs, a relay UE from the candidate UEs;

wherein the load information is determined by the candidate UE based on a measurement result of sidelink communication (SL) and load indication information;

wherein the measurement result of the SL is obtained by the candidate UE by measuring a transmission link, and the measurement result of the SL comprises at least one of a channel busy ratio (CBR) of the SL or a channel occupancy ratio (CR) of the SL; and wherein the load indication information is sent by the base station to the candidate UE, and the load indication information is configured to indicate a load status of a cellular communication link between the candidate UE and the base station;

wherein the first UE is further configured to:

select, according to the load information of the candidate UEs, the relay UE from the candidate UEs whose load status meets a requirement, wherein the load status meeting the requirement comprises at least one of:

an overload indication, indicating that the candidate UE is not overloaded;

a load level, indicating that a level of a load of the candidate UE is lower than a first threshold; or a load rate, indicating that a load rate of the candidate UE is lower than a second threshold; and determine that there are at least two candidate UEs whose load status meets the requirement, and select a candidate UE with a lowest load level or a lowest load rate as the relay UE;

wherein the candidate UE is configured to send the load information to the first UE;

wherein the base station is configured to send the load indication information to the candidate UE; wherein the load indication information is used for the candidate UE to determine the load information.

* * * * *